March 5, 1940.   G. E. SZEKELY   2,192,565
THREADED FOLLOWER PIPE JOINT OR FITTING
Filed April 6, 1938
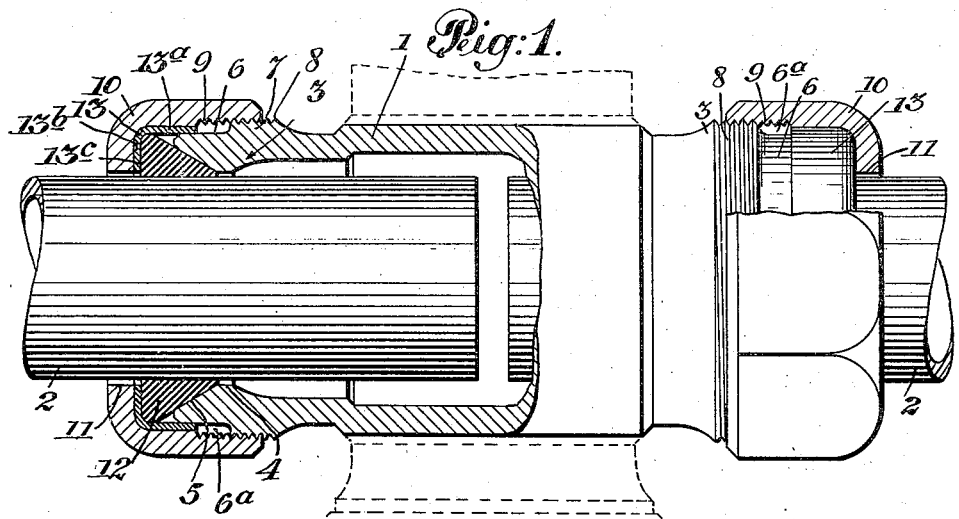
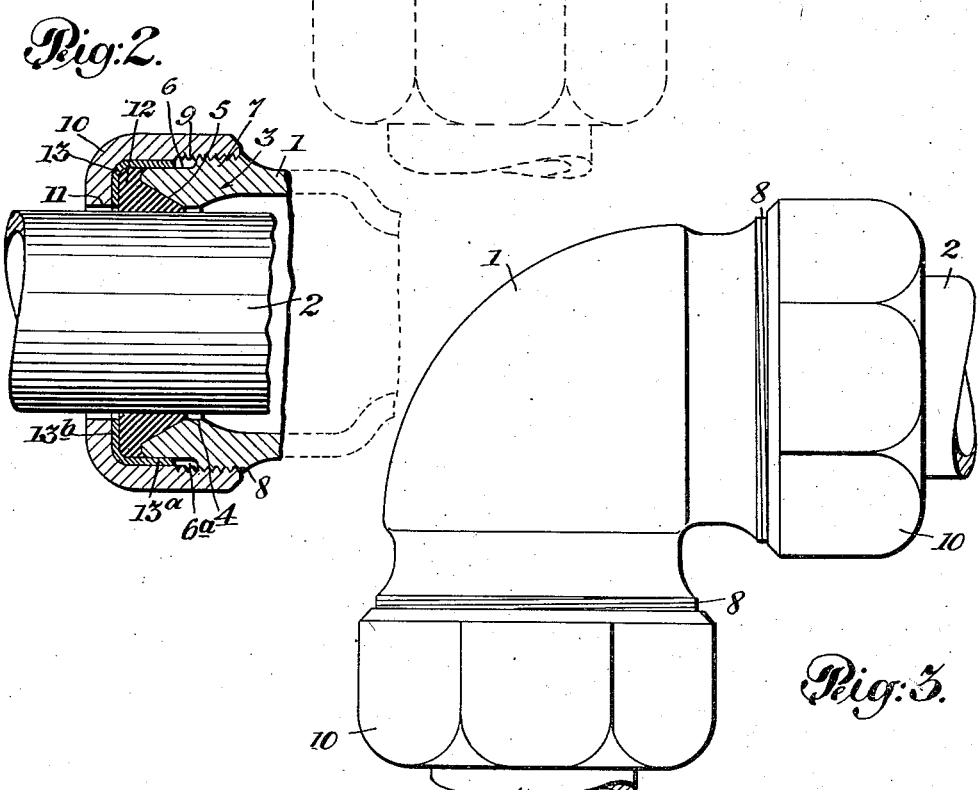
INVENTOR
George E. Szekely
BY
Louis Prevost Whitaker
ATTORNEY Patented Mar. 5, 1940

2,192,565

UNITED STATES PATENT OFFICE 2,192,565

THREADED FOLLOWER PIPE JOINT OR FITTING

George E. Szekely, Bradford, Pa., assignor, by mesne assignments, to Dresser Manufacturing Company, Bradford, Pa., a corporation of Pennsylvania Application April 6, 1938, Serial No. 200,343

2 Claims. (Cl. 285—122)

My invention consists in the novel features hereinafter described, reference being had to the accompanying drawing which illustrates one embodiment of the same selected by me for purposes of illustration, and the said invention is fully disclosed in the following description and claims.

The object of my invention is to provide a threaded follower pipe joint or fitting intended especially for underground use, for either plain or threaded pipes, which is applicable to all the forms of fittings usually provided for the connection of threaded pipes only, such as couplings, L's, T's, crosses, and also applicable to bell and spigot joints, and which can be made up in any of the forms, in different sizes to accommodate plain end or threaded pipe sections of different standard diameters, and providing among others the following advantageous features, to wit:

The elimination of all connecting bolts for compressing the gaskets.

The accommodation of gaskets of sufficient size to accommodate variations in the exterior diameters of pipes of the same standard interior diameter, and irregularities such as surface variations and pittings of the pipe ends.

The accommodation of the fittings to pipe ends having their axes disposed at an appreciable angle to the axis of the terminal aperture in the fitting.

The provision of a wall of considerable thickness to receive the threads upon which the follower nuts are screwed.

The provision of a recess on the exterior of the terminal portions of the fittings surrounding the packing recesses, and between it and the inner surface of the follower nut, and beyond the exterior thread surface of the said terminal portions, to accommodate the cylindrical portions of a cup-shaped metallic follower engaging the outer end of the gasket.

The provision of packing recesses having inwardly tapered walls to receive annular packing rings having tapering outer surfaces to provide a wedging effect when the follower nuts are screwed up and a sufficient body of compressible material in the gaskets to insure a tight joint under all circumstances.

These and other advantages to be hereinafter pointed out are secured by my invention, and in the accompanying drawing I have illustrated one embodiment thereof, selected by me for purposes of illustrating the invention.

In the said drawing:

Fig. 1 is an elevation, partly in section, of a fitting in the form of a coupling embodying my invention before the follower nuts are screwed up, dotted lines indicating how additional terminal portions may be provided to apply my invention to a T or cross.

Fig. 2 is a sectional view of one of the terminal portions of a fitting showing the follower nut screwed up and the gasket compressed.

Fig. 3 is an elevation of a fitting in the form of an L embodying my invention.

The body of the fitting, indicated at 1, may be in the form of a sleeve, as shown in Fig. 1 in full lines (or an L or T as indicated in dotted lines in that figure), or it may be an L, as indicated in Fig. 3. It will also be understood that my invention is applicable to bell and spigot joints, in which case the part corresponding with the body 1 will be the bell portion of one of the connected pipe sections. Obviously the body will be provided with one, two or more openings surrounded by terminal portions to receive a pipe member 2, according to the form of the joint or fitting, and as these terminal portions are of the same construction, a description of one will serve for all.

Referring to Fig. 1, which shows a coupling in full lines, the main body 1 is provided with a terminal portion 3 at each end surrounding aligned pipe receiving apertures, one of which is indicated at 4. The outer end of each terminal portion 3 is provided with a packing recess 5, the wall of which tapers inwardly to the pipe aperture 4. The outer surface of said terminal portion has a cylindrical portion 6 extending from the outer end to an annular portion 7 of greater diameter, the outer face of which is provided with screw threads 8 to be engaged by the interior threads 9 on the annular follower nut 10, which has an aperture 11 therein to accommodate the pipe section 2. There is formed therefore a packing receptacle between the exterior of pipe section 2, the packing recess 5, and the inner surface of the nut 10, to receive a gasket 12 of rubber, rubber composition, or other suitable material, which is of wedge shape or substantially triangular in cross section.

The nut 10 is so formed that the inner face of its cylindrical portion is of greater diameter than the cylindrical portion 6 of the fitting, thus forming an annular recess 6a between them. A cup shaped metal follower 13 surrounds the outer end of the gasket and fits loosely within the follower nut, so that in turning up the nut the follower is held stationary by its frictional engagement with the gasket and the nut turns with respect to the follower, so that there is no frictional contact between the rotatable nut 10 and the follower, and hence no tendency to turn the gasket and abrade or injure its surfaces. The follower has a cylindrical portion 13a, and an inwardly extending annular flange 13b at its outer end, forming an aperture 13c, for surrounding the pipe section 1. The cylindrical portion 13b of the follower fits and telescopes easily over the cylindrical portion 6 of the fitting, and is accommodated within the recess 6a, and the cylindrical portion 6 is of such length that the screwing up of the nut to effect maximum compression of the gasket will not bring the follower into contact with the shoulder at the inner end of the recess 6a, where it terminates at the enlarged and thickened portion 8 in which the exterior nut-engaging threads 7 are formed.

The apertures in the metal parts, i. e., pipe aperture 4, and apertures 11 and 13c, are preferably not only larger than the exterior diameter of the standard pipe for which the joint or fitting is provided, to accommodate variations in the exterior of the pipe sections, but I prefer to make these apertures sufficiently larger to accommodate appreciable deviation of the axis of the pipe section from alignment with the axis of the pipe apertures, as this condition frequently occurs in the connection of pipes. The tapered form of the gasket and packing recess facilitates the insertion of the gasket in the recess, notwithstanding such deviation of the axes of the pipe and fitting, and the gasket, which has its outer end of considerably greater diameter than the greatest diameter of the packing recess, provides a sufficient body of packing material to fill all the space between the pipe, the packing recess and the follower.

In Fig. 2, the parts are shown in the positions they assume when the follower nut is screwed up, and it will be noted that the gasket 12 is compressed longitudinally and expanded laterally into contact with the pipe section 2, and the outer portions are crowded around the end of the terminal portion 3, and into contact with the inner face of the metal follower 13, the cylindrical portions 13a of which have passed over the cylindrical portion 6 of the terminal portion 3, and thus tend to prevent extruding of the gasket.

When the device is made in the form of a coupling or sleeve, as in full lines in Fig. 1, I have found it convenient to form it of steel and upset the ends to the shape shown in Fig. 1. Other fittings will ordinarily be cast, but the particular metal and method of forming the parts of the joint or fitting do not constitute any part of my invention.

In some instances the terminal portion which receives the pipe end may be integral with one end of a pipe section, and constitute a bell end of a bell and spigot joint, as I have indicated in dotted lines in Fig. 2, and this is of course within the scope of my invention.

Fig. 3 indicates an L having its terminal portions formed as shown in section in Figs. 1 and 2.

While my improved joint or fitting is intended primarily for use with plain end or unthreaded pipe sections, and for use under ground where such joints are subjected to greater stresses, due to changes in temperature and settling of parts of the line, to resist which the greater wall thickness of the terminal portion 3, at 7, where threads 8 are cut, is provided, it is of course obvious that the joints or fitting may also be used above ground, and within buildings if desired, and may likewise be used for connecting pipe sections, the ends of which have been threaded, if desired. The threading of the pipe ends, however, is obviously unnecessary and does not assist in any way in making the joint.

What I claim and desire to secure by Letters Patent is:

1. A joint or fitting for metal pipes comprising a cylindrical portion provided with uninterrupted external threads a short distance back from its end, and a smooth cylindrical terminal portion of slightly less diameter than said threads, said cylindrical portion having a pipe aperture at a distance in from its end and an outwardly flaring conical wall, forming a packing recess between it and the pipe, a molded rubber packing ring for surrounding a pipe and having a conical portion to engage said packing recess of said cylindrical portion, a cup shaped sheet metal follower, fitting the outer end of said packing ring and having cylindrical portions projecting beyond the adjacent lateral portions of the packing ring to slidingly engage the smooth terminal portion of the fitting and forming a continuation of the packing recess and a nut fitting over said follower, and having cylindrical internally threaded portions extending beyond the cylindrical portions of the follower to engage said external threads.

2. A joint or fitting for metal pipes comprising a cylindrical portion provided with external threads a short distance back from its end and a smooth cylindrical terminal portion of slightly less diameter than said threads, and having a conical packing face, forming a packing recess with a pipe aperture at its inner end, a molded rubber packing ring of greater length than the packing recess, and having an exterior conical face and an outer end of greater diameter than the greatest diameter of the packing recess, a sheet metal follower surrounding the outer end of said packing ring and having cylindrical portions projecting beyond the adjacent portions of the packing ring and fitting and telescoping over the said cylindrical terminal portion, and a nut fitting said follower and having cylindrical portions internally threaded to engage said external threads, and compress the packing ring within the packing recess, and expand the portions of the packing ring exterior to said recess into sealing contact with the inner surface of the follower, the exterior surface of a pipe to be connected and the end of the said cylindrical portion of the fitting, and providing a greater amount of packing material than could be accommodated in said packing recess.

GEORGE E. SZEKELY.